Nov. 30, 1965     W. E. SWIGER ETAL     3,220,132

MAGNETIC PICTURE HOLDER

Filed Nov. 22, 1963

INVENTORS
William E. Swiger
Gyozo C. Palffy
BY McCoy, Greene, Mecleat
& Te Grotenluis
ATTORNEYS United States Patent Office 3,220,132
Patented Nov. 30, 1965

3,220,132
MAGNETIC PICTURE HOLDER
William E. Swiger, 7860 Joyce Drive, Parma 30, Ohio, and Gyozo C. Palffy, 9013 Cambridge Drive, Parma 29, Ohio
Filed Nov. 22, 1963, Ser. No. 325,620
4 Claims. (Cl. 40—152.1)

The present invention relates to a miniature picture holder and more particularly to a simple, inexpensive plastic picture holder for automobile dashboards, having magnetic means for locating the holder in place on a metal dashboard.

The present invention contemplates two different types of picture holders. The preferred holder has a two-piece circular picture frame comprising a circular disc for receiving a circular picture and a circular windowpane and has an annular member interfitting with said disc to clamp the picture between the windowpane and the disc. The two-piece frame has diametrically opposed pins or projections fitting in the cylindrical openings of the supporting member, said pins being split in half, one semi-cylindrical projection being provided by the disc and the other being provided by said annular member. The two halves of each pin fit together and are held together by the walls of the cylindrical openings. The two arms of the supporting member are sufficiently flexible to permit spreading of the arms and removal of the pins from the openings whereby the frame may be removed from the supporting member.

A modified form of the invention may be employed which uses a one-piece picture frame instead of a two-piece frame. The one-piece frame is hollow and preferably annular and has an annular groove which receives a flat circular backing disc. A circular picture is placed on said disc and covered by a circular windowpane which also fits in said annular groove. A split plastic ring is also mounted in the groove to locate the backing disc and windowpane in the frame. The ring preferably has projecting finger tabs to facilitate removal of the ring from the groove.

The holder of this invention is preferably provided with a tapered groove at the upper ends of the diverging arms to facilitate assembly but this is not essential.

An object of the present invention is to provide a simple inexpensive picture holder which may be easily mounted on the dashboard of an automobile.

A further object of the invention is to provide a picture holder which has a minimum number of parts and can be held together without screws or other metal attaching means.

Another object of the invention is to provide a miniature picture holder which may be readily assembled and disassembled.

Other objects, uses and advantages of the invention will become apparent to those skilled in the art from the following description and claims and from the drawings in which:

Figure 1:
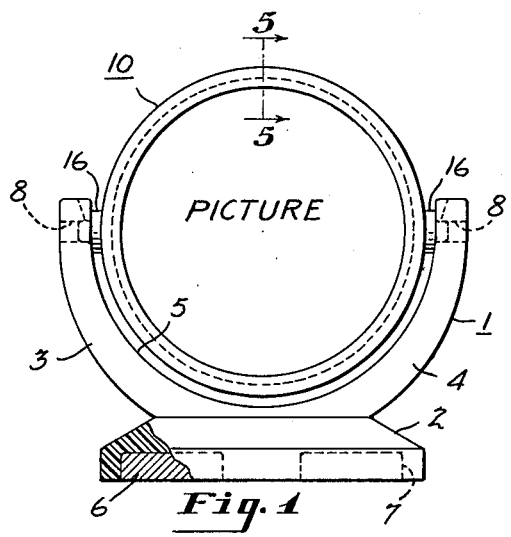
FIGURE 1 is a front elevational view showing the preferred form of picture holder according to this invention, a portion being broken away and shown in section.

Referring more particularly to the drawings in which like parts are identified by the same numerals throughout the several views, FIGURES 1 to 8 show a miniature picture holder constructed according to this invention and comprising a molded plastic supporting member 1 and a two-piece molded plastic picture frame 10. The assembled magnetic picture holder may readily be placed on the metal portion of an automobile dashboard to display the picture.

The supporting member 1 is formed of a suitable synthetic resin material, such as polyvinyl chloride, polystyrene, or the like, and has a generally rectangular horizontal base 2 with a pyramidoidal upper surface and has two curved arms 3 and 4 integral with said base and extending upwardly therefrom to define a semi-circular recess. The semi-circular upper surface 5 of the arms forms the bottoms and sides of said recess and is concentric to the frame 10.

Figure 2:
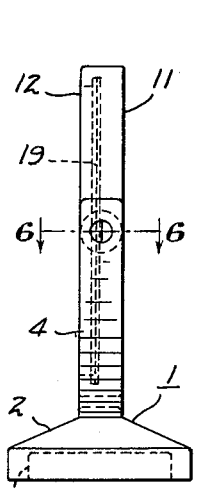
FIGURE 2 is an end view of the picture frame on the same scale as FIGURE 1.
Figure 4:
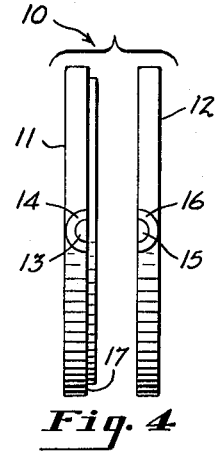
FIGURE 4 is an exposed side elevational view showing the two parts making up the picture frame.
Figure 3:
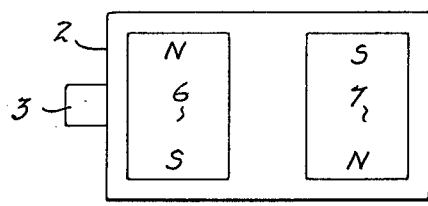
FIGURE 3 is a bottom view showing the base of the holder.

A pair of elongated rectangular metal magnets 6 and 7 fit in the base 2 as shown in FIGURES 1 and 2 and have flat bottom surfaces flush with the flat horizontal bottom surface of the base 2. These magnets are attracted to the metal of the automobile dashboard and prevent the picture holder of this invention from falling off the dashboard.

Figures 5, 6:
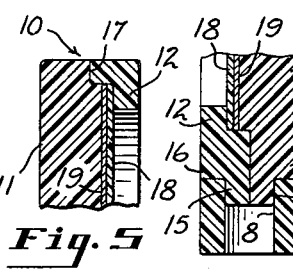
FIGURE 5 is a fragmentary vertical sectional view taken on the line 5—5 of FIGURE 1 and on a larger scale.
FIGURE 6 is a fragmentary, horizontal sectional view taken on the line 6—6 of FIGURE 2 and on the same scale as FIGURE 5.

The picture frame 10 is also molded from a synthetic resin material, preferably the same material as the supporting member 1. Both the member 1 and the two parts 11 and 12 of the frame 10 may be formed by a conventional injection molding process. The circular disc portion 11 interfits with the annular member 12 as best shown in FIGURES 5 and 6 to provide the generally circular picture frame 10 which is pivotally mounted on the member 1 by suitable means. In order to provide such pivot means, the upper end portions of the arms 3 and 4 are provided with horizontally aligned cylindrical openings 8 in the upper end portions of said arms and the members 11 and 12 are provided with semi-cylindrical projections 13 and 15 which fit together to form horizontal radial pins of a size to fit the openings 8 as shown in FIGURE 6. As herein shown, the disc 11 has two semi-cylindrical boss portions 14 coaxial with the projections 13 and the annular member 12 has two similar boss portions 16 at the projections 15.

The construction of the preferred picture holder shown in the drawings will become apparent from FIGURES 1 to 8 which are drawn to scale, but it will be apparent that the size and shape of the holder may be varied somewhat. The disc 11 is provided with an annular marginal groove 17 to receive the inner end portion of the annular member 12 which has an L-shaped cross section as shown in FIGURES 5 and 6. A flat circular windowpane 18 and a flat circular picture 19 are clamped between the members 11 and 12 and held in place as shown in FIGURES 5 and 6, the diameter of the elements 18 and 19 preferably being substantially equal to the internal diameter of the member 12 at the groove 17. The windowpane 18 is formed of glass, plexiglass or other suitable transparent material and covers the circular window formed by the annular member 12. The elements 11 and 12 fit tightly together at the groove 17 so that a force is required to separate these parts even when the frame 10 is removed from the supporting member 1. It is unnecessary to employ screws or other connecting means. Furthermore, the two parts 11 and 12 are held together by the walls of the openings 8 which prevent separation of the pin portions 13 and 15 (see FIGURE 6). The miniature picture holder of this invention can be made at extremely low cost because of the minimum number of parts, the ease of assembly, the ease of molding the parts, and the lack of necessity of screws or other attaching means. For this reason, the holder is very inexpensive and highly salable.

Figure 7:
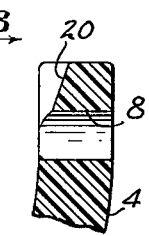
FIGURE 7 is a fragmentary longitudinal vertical sectional view on an enlarged scale showing the upper end portion of one of the arms of the supporting member.
Figure 9:
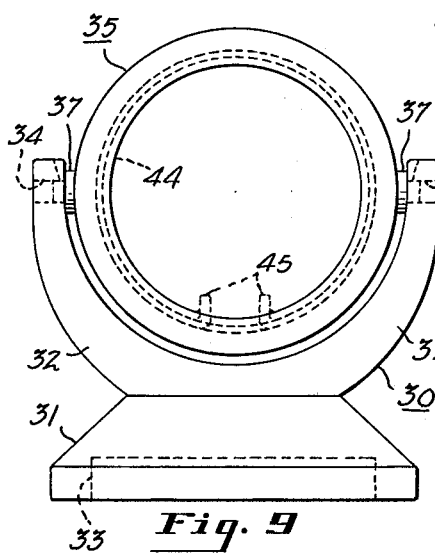
FIGURE 9 is a front elevational view showing a modified form of picture holder.
Figure 10:
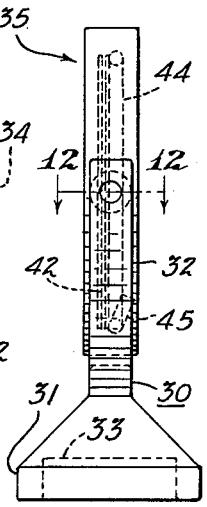
FIGURE 10 is an end elevational view of the holder shown in FIGURE 9.
Figure 11:
FIGURE 11 is a perspective view showing the plastic locking ring used with the holder of FIGURES 9 and 10.
Figures 8, 12:
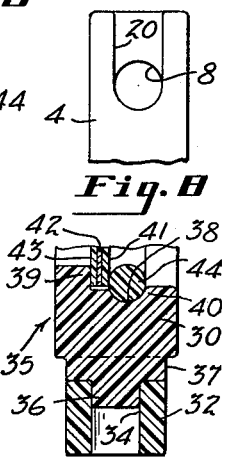
FIGURE 8 is a fragmentary front elevational view looking in the direction of the arrows in FIGURE 7.
FIGURE 12 is a fragmentary horizontal sectional view taken on the line 12—12 of FIGURE 10 and on a larger scale.

Means are provided to facilitate assembly of the pins 13–15 in the holes 8. A tapered groove 20 is provided at the upper portion of each of the arms 3 and 4 to guide the pins 13–15 into the holes 8. Each groove 20 is located above the cylindrical opening 8 and has a flat bottom surface which is inclined as shown in FIGURE 7 so that downward pressure on the pins wedges the arms 3 and 4 apart. Each groove 20 has a width substantially equal to the diameter of the hole 8 as shown in FIGURE 8 so that assembly of the frame 10 on the arms 3 and 4 can be accomplished very rapidly. The arms 3 and 4 may be formed of a plastic having a high rigidity, but such arms are sufficiently flexible to separate a small distance and thereby permit assembly. Due to the elasticity of the arms 3 and 4, these arms return to their normal position as shown in FIGURE 1 and prevent accidental separation of the frame from the supporting member. It will be noted that the weight of the picture frame 10 is directed away from the groove 20 so that the pivots at 8 are highly effective in spite of the groove.

Another form of picture holder is shown in FIGURES 9 to 12 of the drawings. This picture holder differs from the holder of FIGURES 1 to 8 because the picture frame is molded in one piece instead of two pieces. The parts, therefore, function in a different manner.

The modified picture holder has a supporting member 30 with a generally rectangular base 31 having a pyramidoidal upper surface which is higher than that of the base 2. The member 30 also has two arcuate arms 32 somewhat thicker than the arms 3 and 4. The base 31 is constructed to receive a single metal rectangular magnet 33, but it will be understood that the holder could have two or more magnets.

The member 1 has pivot means including two axially aligned cylindrical openings 34 which receive the pivot pins 36 of the molded one-piece picture frame 35. The pins 36 are similar to the pins 13–15 but are formed in one piece rather than in two pieces. Likewise, the one-piece bosses 37 are similar to the two-piece bosses 14–16 of the frame 10.

The picture frame 35 is molded in one piece from a suitable synthetic resin material and differs from the two-piece frame 10 because it has an opening extending therethrough. Such circular opening is closed by the flat circular plastic backing disc 41, whereas the disc 11 of the frame 10 does not require such a backing disc.

The frame 35 is formed with an annular groove 38 having a shoulder 39 of square cross section and a shoulder 40 of rounded cross section as shown in FIGURE 12. A flat circular backing disc 41, a flat circular picture 42, and a flat circular windowpane 43 similar to the pane 18 are mounted in the groove 38, the flat pane 43 resting against the flat inner surface of the shoulder 39 as shown in FIGURE 12.

A split locking ring 44 of circular cross section is mounted in the groove 38 and engages the shoulder 40 to press the elements 41, 42 and 43 toward the shoulder 39 and to hold such elements in place. Said ring, in the normal unstressed condition, has a diameter slightly greater than the maximum diameter of the groove 38 so that the ring springs outwardly against the bottom of the groove. When the ring is compressed to a circular position, it fits in the groove 38 as shown in FIGURE 12 and has the same diameter as the groove. The ring 44 is formed of a suitable synthetic resin material and may be formed of the same material as the frame 35 or the frame 10. In order to facilitate assembly and disassembly, the locking ring 44 is provided with finger tabs 45 at its opposite ends extending axially from the groove 38. If desired, the tabs may be inclined so as to extend radially inwardly as well as axially outwardly.

The miniature picture holder of FIGURES 9 to 12 may have overall dimensions similar to that of the miniature picture holder shown in FIGURES 1 to 8 of the drawings. Each of the frames 10 and 35 has an external diameter of about 1 to 2 inches, and the base 2 or 31 has a length no greater than about 2 inches. The holder, therefore, is very light and may be effectively held in position on the dashboard by magnets.

It will be understood that, in accordance with the provisions of the patent statutes, minor variations and modifications of the specific picture holders shown herein may be made without departing from the spirit of the invention.

Having described our invention, we claim:

1. A miniature picture holder for automobile dashboards comprising a molded one-piece supporting member formed of a synthetic resin material and having a generally rectangular horizontal base and two curved arms integral with said base and extending upwardly therefrom to define a semi-circular recess, at least one magnet mounted in said base and having a lower surface flush with the lower surface of said base, a pair of horizontally aligned cylindrical openings in the upper end portions of said arms, a two-piece circular picture frame formed of synthetic resin material and comprising a first circular disc having diametrically opposed semi-cylindrical radial projections and a second annular member interfitting with said disc and having semi-cylindrical radial projections aligned with the projections of said first member, the associated projections of said frame fitting in the openings of said arms to provide pivot means for said frame and being held together by the walls of said openings, and a flat transparent circular windowpane clamped between said disc and said annular member, said arms being sufficiently flexible to permit outward movement of the upper end portions of said arms and removal of said projections from said openings.

2. A picture holder as defined in claim 1 wherein said base has a pyramidoidal upper surface and two magnets are mounted in said base below said surface.

3. A picture holder as defined in claim 1 wherein a tapered groove is provided at the upper portion of each arm adjacent the projections of said frame to facilitate assembly, said groove being located above the cylindrical opening of the arm to guide the projections into said opening as the frame is lowered.

4. In combination, a plastic supporting member having bifurcated arms with aligned circular openings therein, a swinging member having aligned pins rotatably supported in said openings, and a tapered groove in each arm for guiding the pin into the opening.

References Cited by the Examiner

UNITED STATES PATENTS

| | | | |
|---|---|---|---|
| 634,146 | 10/1899 | Maddox | 40—152.1 |
| 1,914,068 | 6/1933 | Birnn | 40—152.1 |
| 2,288,732 | 7/1942 | Nickerson | 40—156 |
| 2,416,976 | 3/1947 | Barbieri | 40—152.1 |
| 2,887,804 | 5/1959 | Wise | 40—152.1 |

FOREIGN PATENTS

| | | |
|---|---|---|
| 281,970 | 6/1952 | Switzerland. |

JEROME SCHNALL, *Primary Examiner.*
EUGENE R. CAPOZIO, *Examiner.*